United States Patent [19]

Konrad

[11] Patent Number: 4,520,299
[45] Date of Patent: May 28, 1985

[54] TURNING SPEED CONTROLLER FOR ELECTRIC VEHICLES HAVING DUAL DRIVE MOTORS

[75] Inventor: Charles E. Konrad, Roanoke, Va.
[73] Assignee: General Electric Company, Charlottesville, Va.
[21] Appl. No.: 564,573
[22] Filed: Dec. 22, 1983
[51] Int. Cl.$^3$ .................. B62D 11/04; H02P 7/68
[52] U.S. Cl. ......................... 318/587; 318/82; 180/6.28; 180/6.5
[58] Field of Search ............ 318/82, 587; 180/6.2, 180/6.28, 6.44, 6.5

[56] References Cited

U.S. PATENT DOCUMENTS

| | | | |
|---|---|---|---|
| 3,720,863 | 3/1973 | Ringland et al. | 318/67 X |
| 4,166,238 | 8/1979 | Binner | 318/67 |
| 4,196,785 | 4/1980 | Downing, Jr. | 180/6.28 |
| 4,264,851 | 4/1981 | Paramythioti et al. | 180/6.28 X |
| 4,449,598 | 5/1984 | Hönes et al. | 180/6.28 X |

*Primary Examiner*—S. J. Witkowski
*Assistant Examiner*—Bentsu Ro
*Attorney, Agent, or Firm*—Ormand R. Austin

[57] ABSTRACT

The invention disclosed provides a control system for an electric vehicle which automatically slows the vehicle during a turn and causes it to be increasingly slowed as the sharpness of the turn increases. The invention includes means for regulating the field excitation in accordance with a field regulating signal; means providing an armature current indicative signal; means providing a turning angle signal which is indicative of the turning angle of the vehicle; and a field excitation selector which receives the armature current indicative signal and the turning angle signal and then selects one or the other or a minimum reference value as the field regulating signal. The signal which produces the maximum field excitation is thus automatically selected. If a turning maneuver is being carried out, the turning angle signal increases until, at some point, the field excitation becomes a function of the steering angle and the vehicle is then automatically slowed as a function of the sharpness of the turn.

5 Claims, 5 Drawing Figures

TURNING SPEED CONTROLLER FOR ELECTRIC VEHICLES HAVING DUAL DRIVE MOTORS

The present invention relates to a control system for controlling a pair of separately excited motors arranged such that each motor of the pair drives a separate wheel on a common axle of an electrically powered vehicle.

This application is related to application Ser. No. 564,176 and is of common assignee therewith.

BACKGROUND OF THE INVENTION

It is known to provide individual motors for the driven wheels of an electrically powered vehicle. For example, dual motors are commonly applied to the two drive wheels of a three-wheeled vehicle of the type wherein the third wheel is used for steering. When considering the oppositely mounted drive wheels in a vehicle of this type, it is obvious that, during a turning maneuver, the geometry of the turning radius forces one wheel (i.e., the inside wheel) to cover less distance than the other wheel (i.e., the outside wheel). With these vehicles it is, therefore, necessary to change the speed of one motor relative to the other as a turn is being carried out. If the torque applied to both wheels continues to be the same, independent of the steering angle, the inside wheel tends to slip and wear against the opposing surface.

One common method of dealing with this problem heretofore has been to use an angle sensing switch on the steering wheel and to then switch off the power to the inboard motor once the steering angle has reached some preset value (e.g., a 15 degrees turning angle). Controlling the drive motor in this manner, however, produces a lack of continuity in the vehicle's operation and detracts from its "feel" in a turning maneuver. There is also a lack of maneuverability which is particularly noticeable when the vehicle is operated on a slippery surface such as a dock plate. To better deal with these problems, some efforts have been made to individually control the torque on each motor using separate power regulators which are controlled as a function of the sensed steering angle. However, although these separate power regulation methods are seen as an improvement, other and more effective means of torque proportioning control have been sought by workers in the field.

Another, more general, problem arising during a turning maneuver of an electric vehicle relates to the speed at which a turn can safely be made. It is, of course, common sense that a vehicle frequently needs to be slowed down when a turn is being made. It nevertheless happens that inexperienced operators, and others, will execute a turn at an excessive speed. In view of the potential safety problems arising out of this kind of operation, some means has also been sought to automatically slow a vehicle during a turn and to cause it to be increasingly slowed as the sharpness of the turn increases.

Accordingly, it is among the objects of the present invention to provide a control system for an electric vehicle, which overcomes those problems outlined above; a control system which continuously and individually adjusts the field excitation of the drive motors so that torque and speed of the separate wheels are apportioned to the wheels as a function of the steering angle of the vehicle.

SUMMARY OF THE INVENTION

These and other objects are attained in an electric vehicle control system which, in its preferred form, includes: means for regulating the field excitation in accordance with a field regulating signal; means providing an armature current indicative signal; means providing a turning angle signal which is indicative of the turning angle of the vehicle; and a field excitation selector which receives the armature current indicative signal and the turning angle signal and then selects one or the other of those signals or a minimum internal reference value as the field regulating signal. The signal which produces the maximum field excitation is thus automatically selected. If a turning maneuver is being carried out, the turning angle signal increases until, at some point, the field excitation becomes a function of the steering angle and the vehicle is then automatically slowed as a function of the sharpness of the turn.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
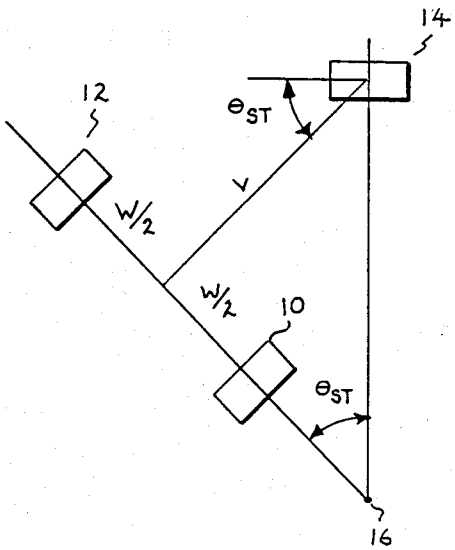
FIG. 1 is a schematic diagram illustrating aspects of the turning geometry for typical three-wheeled vehicles.

Initially, it will be helpful to consider the velocity and geometrical relationships between the wheels of a vehicle as it is undergoing a turning maneuver. FIG. 1, for example, diagrams certain of the relationships for a three wheel vehicle wherein the third, rear wheel is used for steering. The vehicle is shown turning through a steering angle $\theta_{ST}$ such that the two front wheels 10 and 12 may be considered, for the turn illustrated, to comprise an inside wheel 10 and an outside wheel 12. The wheels 10 and 12 are separated on the same axle line by distance W and there is a distance L from the forward axle line to the center of the rear steering wheel 14. The center of curvature for the turn is illustrated to be at a point 16 outside the vehicle. Thus, a radial line from the center of curvature along the front axle line is separated from a line through the rear steering wheel 14 by the steering angle $\theta_{ST}$. For small steering angles $\theta_{ST}$, the center of curvature for the turn is outboard of the vehicle as illustrated. As the steering wheel is turned sharper and sharper, the center of curvature moves toward the inside wheel (wheel 10, as illustrated) and eventually moves to a point between the wheels.

Obviously, in a turning maneuver the inside wheel covers less distance than the outside wheel, and accordingly, the inside wheel should be driven at a lower velocity than the outside wheel. It can be shown, in fact, that the desired velocity $V_I$ of the inside wheel is proportional to $$\left(\frac{2L}{W} - \tan \theta_{ST}\right)$$

and the desired velocity $V_o$ of the outside wheel is proportional to $$\left(\frac{2L}{W} + \tan \theta_{ST}\right).$$

Thus, when the vehicle is going in a straight line, $\theta_{ST}$ is equal to zero and, by the trigonometric relationship, so is the tangent of $\theta_{ST}$. Under these circumstances, the speeds of the inside and outside wheels are the same and the ratio of the speed of one to the other is 1.0. During a turning maneuver, however, the inside wheel is desirably running at a lesser speed than the outside wheel so that the ratio of the speed of the inside wheel to the outside wheel declines to zero as the turning angle gets sharper. At some steering angle the desired inside wheel speed reaches zero. This is the point at which the center of curvature of the turn coincides with the center line of the inside wheel. For even sharper steering angles, the center of curvature moves to a point between the wheels and it then becomes desirable to actually reverse the torque on the inside wheel so that it is driven in the opposite direction. Under these circumstances, in terms of the relationships set forth above, the negative value of the tangent function prevails, making the ratio of wheel speeds negative. A control system according to the present invention continuously varies the ratio of the torque of the inboard wheel to the outboard wheel according to the steering angle in a smooth, continuous fashion.

Figure 2:
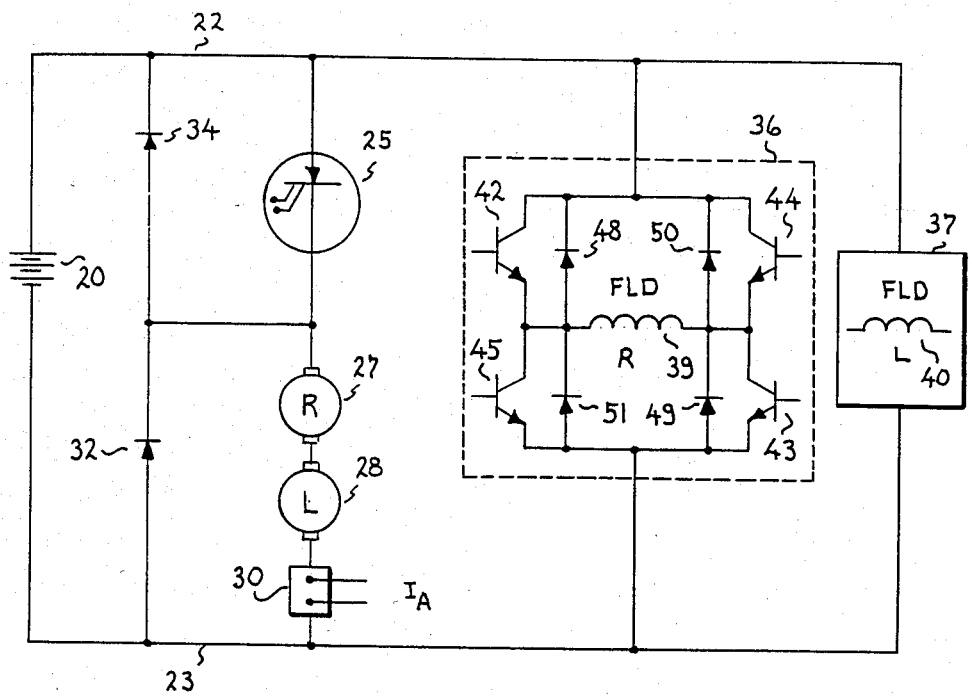
FIG. 2 is a simplified schematic diagram of a portion of control circuitry for an electric vehicle having individual drive motors for two powered wheels.

A basic power circuit for controlling dual, separately excited motors as they may be employed for driving the two powered wheels on a common axle line of an electric vehicle is shown in FIG. 2. Power is supplied by battery 20 to a positive supply bus 22 and a negative supply bus 23. Connected between the positive and negative supply lines 22 and 23 is a series circuit comprising a conventional pulse width modulated chopper 25, series connected armatures 27 and 28 of the dual drive motors, and an armature current sensor 30. The motor armatures 27 and 28 are arbitrarily designated R and L corresponding, respectively, to the right and left wheels of the vehicle. The chopper 25 directly controls current to the armatures 27 and 28 by its mark-space conduction ratio (i.e., its on-time to off-time ratio). Current sensor 30 may be a shunt current sensor providing a signal proportional to the current flowing in the two armatures 27 and 28.

A flyback diode 32, connected in parallel with the armature windings 27 and 28 and current sensor 30, provides a return path for inductive current during the off periods of chopper 25. Connected in a reverse direction across the chopper 25 is a second diode 34 which provides a return path for current to the battery 20 during periods of regenerative braking when the chopper 25 is reversed biased.

Also connected between the dc supply lines 22 and 23 are two transistor bridge circuits 36 and 37. Bridge 36 regulates the field excitation current for the motor field winding 39 and bridge 37 regulates the field excitation current for the motor field winding 40. The field winding 39 may, for example, be provided for the right wheel of the vehicle while the field winding 40 may be provided for the left wheel of the vehicle. The transistor bridge circuits 36 and 37 are, in all substantial respects, identical and only the bridge circuit 36, associated with the right wheel, is shown and described in any detail. Thus, bridge regulator 36 comprises four power transistors 42, 43, 44, and 45 in a typical bridge configuration such that the right field winding 39 is connected between two corners of the bridge and the power bus lines 22 and 23 are connected between the other two corners. Each of transistors 42–45 is provided with a flyback diode, of 48–51, respectively, connected between the transistor emitter and collector terminals. At any given time, depending on the direction of the vehicle, only two of the transistors are conductive while the remaining two are non-conductive. For example, for the forward direction, transistors 42 and 43 may be conductive while transistors 44 and 45 are non-conductive. Under those conditions, field current would be from the battery 20, through 25 transistor 42, the field winding 39, transistor 43, and back to the battery 20, thus creating a magnetic field for a forward driving direction. For the reverse direction, transistors 44 and 45 are conductive while transistors 42 and 43 are non-conductive. The excitation current through the field winding 39 is thus reversed and the magnetic field is such as to cause the motor to drive in a reverse direction. The polarity of the signals applied to the bases of the transistors 42–45 determines whether these transistors are conductive or non-conductive, and the magnitude of the applied base drive signals determines the level of current carried by each transistor. Thus, the polarity and magnitude of the signals applied to the bases of transistors 42–45 determines the direction and magnitude of the field excitation. Since there are separate transistor bridge regulators 36 and 37, two drive wheels, left and right, can be independently controlled in direction and in speed and torque.

Figure 3:
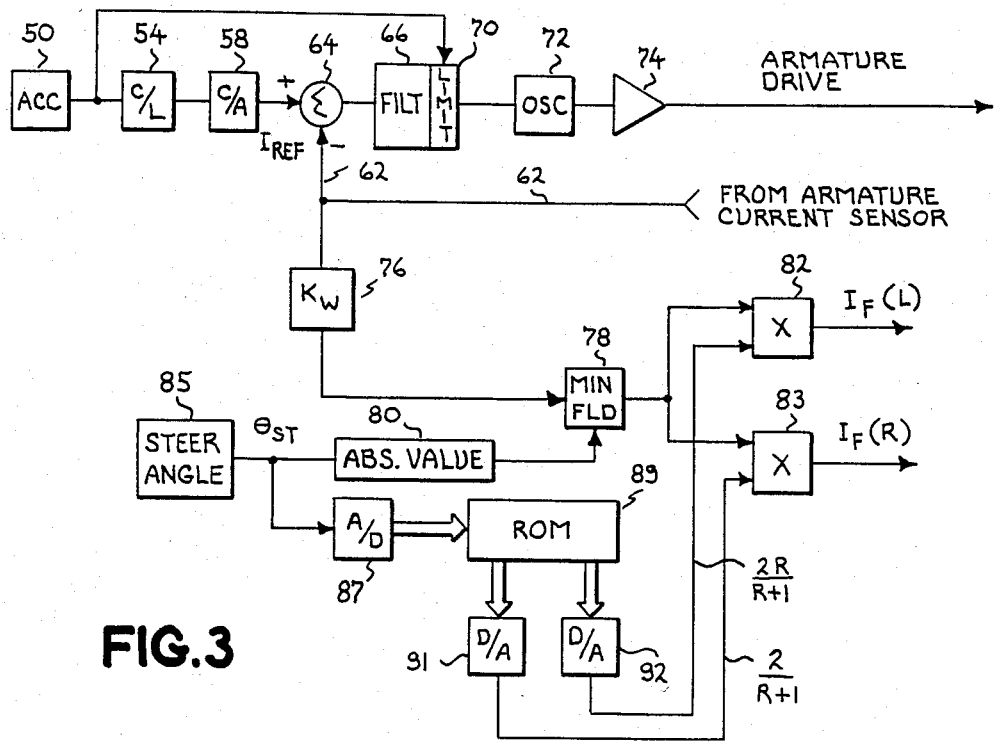
FIG. 3 is a block diagram of a control system, according to the present invention, operable in combination with the circuitry of FIG. 2.

FIG. 3 illustrates a regulating system for generating command signals according to which the power circuitry of FIG. 2 may be controlled. The armature current controlling portion of the system comprises accelerator pedal 50, current limit circuit 54, control acceleration circuit 58, summing junction 64, filter circuit 66, limit circuit 70, oscillator 72, and amplifier 74. This armature regulating portion of the control system is fully described in allowed U.S. patent application Ser. No. 333,931, now U.S. Pat. No. 4,427,930 of common assignee with the present invention, the disclosure of which is incorporated herein by reference.

Accelerator 50 provides a current reference, or tractive effort signal, representative of a desired tractive effort to be put forth by the vehicle driving motors. Simultaneously, the accelerator 50 also provides a voltage reference signal which is applied to limit circuit 70. The current reference signal is directly proportional to accelerator depression and is coupled to a current limit circuit 54.

The current limit 54 limits the magnitude of the tractive effort signal in the event a monitored condition, such as motor temperature, exceeds some preselected value. The output signal from current limit 54 is coupled to control acceleration circuit 58 (which limits the rate of change of the signal) and then to summing junction 64. Summing junction 64 may simply be a summing amplifier wherein the tractive effort indicative signal from controlled acceleration circuit 58 is compared with the actual armature current signal which is returned on line 62. The armature current signal on line 62 may be derived, for example, from the current sensor 30 of FIG. 2.

The error signal output from summing junction 64 is applied to filter 66 which limits the rate at which the error signal can increase. Connected to the filter circuit 66 is a limit circuit 70 which restricts the output of the filter circuit 66 to a value not in excess of the value corresponding to the voltage reference applied from the accelerator 50. That is, in one sense, the limit circuit 70 is controlled by the voltage reference signal from accelerator pedal 50.

The signal from limit circuit 70 is applied to oscillator 72 which generates a corresponding output signal which determines the mark-space ratio (as for chopper 25 of FIG. 2) for controlling the motor armature current. The current is effectively applied to the series connected armatures through amplifier 74.

When the vehicle is being operated in the motoring mode (as opposed to being electrically braked), excitation of the separate motor fields (e.g., fields 39 and 40 of FIG. 2) is preferably effected in such a way that it is directly proportional to the actual motor armature current. To that end, the motor armature current signal on line 62 is applied as a reference signal to a scaling circuit 76 which simply adjusts the magnitude of the armature current signal as a function of the known characteristics of the particular motors being used. In effect, scaling circuit 76 multiplies the armature current signal by a constant factor $K_W$ which is determined by such motor parameters as the number of turns in the field windings.

The scaled armature current signal is applied to a first input terminal of minimum field selector 78 (to be more fully described herein below) which selects either the scaled armature current signal, a second signal (from absolute value circuit 80), or some minimum value as its output signal.

The output signal from minimum field excitation selector 78 is one of the signals according to which the field excitation is controlled. This field regulating signal is applied in parallel as one input to each of left and right multipliers 82 and 83, respectively. The output of each multiplier, 82 and 83, is a field regulating signal which is applied to control the field strength of the corresponding left or right drive motor. The field regulating signal may be applied, for example, to control bridge regulators 36 and 37 of FIG. 2. It will be recognized, of course, that conventional switching circuitry is included between the multipliers, 82 and 83, and the regulators for directional control capabilities. It will also be recognized that multipliers 82 and 83 may be any one of a variety of commercially available multiplier devices. In general, the provision of field regulating signals from multipliers 82 and 83, and the associated circuitry, comprise means for regulating the field excitation.

The output of each multiplier 82 and 83 is, of course, the product of two input signals. The first input signal to each, as discussed above, is representative of the motor armature current or of some other value, depending on the action of the minimum field selector 78. The second input signal to each of multipliers 82 and 83 is one which is dependent on the vehicle steering angle. Generation of these two signals begins with a steering angle sensor, or transducer 85, which provides a turning angle signal indicative of the turning angle $\theta_{ST}$ of the vehicle's steering wheel. The steering angle sensor 85 may, for example, be a potentiometer whose shaft is mechanically coupled to the steering wheel so that a voltage is produced whose magnitude is representative of the turning radius of the vehicle. The steering angle may be defined to be positive or negative depending on the left or right turning direction of the vehicle and the sensor 85 may generate a positive or negative voltage accordingly. The turning radius signal is applied simultaneously to absolute value detector 80 and analog to digital converter (A/D) 87.

The A/D converter 87 along with read only memory (ROM) 89, and digital to analog (D/A) converters 91 and 92 comprise a lookup table. The function of the lookup table is to provide an inside wheel signal and an outside wheel signal (one signal from each of D/A converters 91 and 92), each of which depends, in a prescribed way, on the value of the steering angle $\theta_{ST}$. The signal from D/A converter 91 is the second input to multiplier 83 and the signal from D/A converter 92 is the second input to multiplier 82.

Operationally, A/D converter 87 receives an analog signal indicative of the steering angle $\theta_{ST}$ from steering angle sensor 85 and converts that signal to a digital signal (e.g., an 8-bit signal) which represents a memory address in ROM 89. Each such addressable location in ROM 89 provides a unique, but related, pair of digital signals which are the input digital signals to D/A converters 91 and 92. The digital signals are converted to analog signals by D/A converters 91 and 92 and are then applied to multipliers 82 and 83, as described above.

The relationship between the analog signal from steering angle sensor 85 and the analog signals from D/A converters 91 and 92 is preferably based on the ratio of desired wheel speeds. This ratio, defined as R, is proportional to a ratio of those factors defined above. That is, R is proportional to $$\frac{\frac{2L}{W} - \tan\theta_{ST}}{\frac{2L}{W} + \tan\theta_{ST}}.$$

Thus, this portion of the wheel speed ratio is strictly based on the vehicle geometry and the turning angle, without reference to the actual wheel speed. This ratio is used to define the two output signals of the lookup table in terms of the turning angle $\theta_{ST}$.

In addition, the sum of the value of the two signals from the lookup table is at all times equal to a constant value. For that purpose, and consistent with dependence on $\theta_{ST}$, one of the two signals is made equal to (1/R+1) and the other is made equal to (R/R+1).

As can be seen, the sum of these two signals is at all times equal to the constant value of 1. Other constant values may be selected simply by multiplying the numerator of each relationship by the same constant. As the turning angle $\theta_{ST}$ becomes larger (i.e., the vehicle turns more sharply) the value of R tends toward zero. This forces the signal value related to (1/R+1) toward the constant value of 1.0 and the other signal value, related to (R/R+1) is forced toward zero. Thus, the signal value (1/R+1) is always applied to the outside wheel multiplier and the signal value (R/R+1) is always applied to the inside wheel multiplier. That is, the field excitation for the outside wheel motor is strengthened, and field excitation for the inside wheel motor is weakened, apportioning the torque of the two wheels in accordance with the steer angle. The determination as to which wheel is the inside and which the outside wheel is a function of the negative or positive value of $\theta_{ST}$.

The elements of the lookup table (i.e., ROM 89, A/D converter 87, and D/A converters 91 and 92) are all conventional elements and are commercially available. For example, ROM 89 may be a Model 2716 available from Intel Corp.; A/D converter 87 may be a Model ADC 0801 available from National Semiconductor Corp.; and D/A converters 91 and 92 may each be a Model DAC 0800 available from National Semiconductor.

The tuning radius signal from steering angle sensor 85 is, as was mentioned above, also applied to absolute value detector 80. Absolute value detector 80 provides an output signal which tracks the $\theta_{ST}$ signal in magnitude but which is of the same polarity regardless of polarity changes in the $\theta_{ST}$ signal. That is, the absolute value detector 80 provides an output signal directly proportional to the turning angle of the vehicle but entirely independent of the left or right direction of the turn. The absolute value detector may be any one of a number of commercially available devices, or it may be a conventional absolute value circuit configured with operational amplifiers.

The absolute value of the $\theta_{ST}$ signal is applied, as has been mentioned, to the second input of minimum field selector 78. Minimum field selector 78 functions as a field excitation selector, and selects as its output, one of its two input signals or an internal reference value depending on which is greater in magnitude. The effect of the minimum field selector 78 is to decrease the speed of the vehicle as a function of the turning angle while maintaining, at all times, some minimum field excitation. That is, as the vehicle turning angle is increased, the vehicle speed is automatically decreased in proportion to the sharpness of the turn. However, some minimum field is always maintained and the speed is not decreased until some minimum, preselected turning angle is reached.

Figure 4:
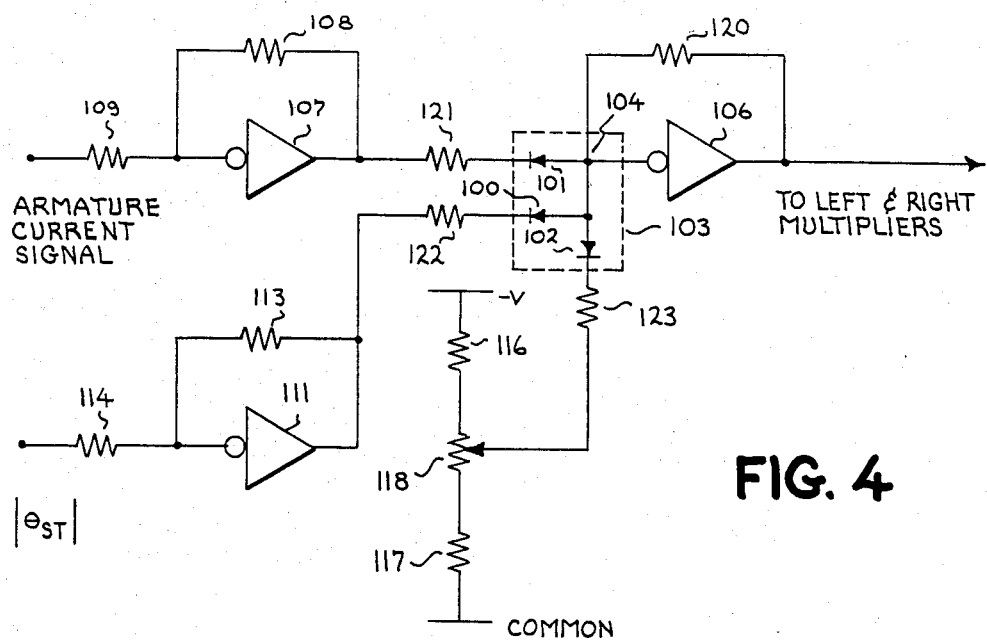
FIG. 4 is a detailed schematic diagram of the minimum field selecting circuitry of FIG. 3.

FIG. 4 is a detailed schematic diagram of one form of circuitry that minimum field selector 78 may take. In FIG. 4, diodes 100, 101, and 102, comprise a maximum value selector 103. The anodes of these diodes are all connected together and to junction point 104. The opposing, cathode end of each diode is connected to a separate signal source. Functionally, the signal that appears at junction 104 is the one applied to diodes 100, 101 and 102 which is greatest in magnitude. The selected signal, after being amplified by amplifier 106, becomes the minimum field selector output signal and is passed to the left and right multipliers. As is well known, increasing the motor field excitation, under certain conditions, slows the motor speed and hence the vehicle speed.

The three signals applied to maximum value selector 103 are those representing (1) the armature current; (2) the absolute value of the steering angle $\theta_{ST}$; and (3) a preselected minimum value of field excitation (i.e., a minimum reference value). For the first signal, the scaled armature current signal is applied to an amplifier 107 whose gain is determined by feedback resistor 108 and input resistor 109 in conventional fashion. The absolute value of $\theta_{ST}$ is applied to amplifier 111 which has associated feedback and input resistors, 113 and 114, respectively.

The preselected minimum field, or reference, value is established by a resistive voltage divider network including fixed resistors 116 and 117 and adjustable resistor 118. These resistors, 116-118, are serially connected between a negative reference voltage and a common reference point so that the voltage established at the moveable arm of adjustable resistor 118 determines the minimum preselected field voltage. The relative gain for each of these three signals, when applied to amplifier 106, is determined by the ratio of the feedback resistor 120 to the corresponding one of the three input resistors 121-123.

Figure 5:
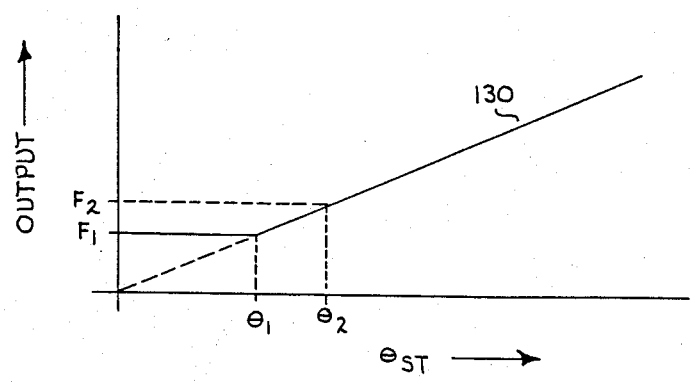
FIG. 5 is a graphical illustration of the output signal of the minimum field selector of FIG. 4 as a function of vehicle steering cycle.

FIG. 5 shows the output of the minimum field selector as a function of the steering angle $\theta_{ST}$. Below some value of turning angle $\theta_1$ (e.g., 15°), and while the armature current is sufficiently low, the minimum field value F1 is selected. When $\theta_1$ is exceeded, however, the output ramps up directly in proportion to $\theta_{ST}$, as along line 130. If the armature current is increased (e.g., the accelerator pedal is depressed further), some point will be revealed at which the armature current signal will prevail over both the $\theta_{ST}$ signal and the minimum field value of $F_1$. For example, for some value of armature current the field value of $F_2$ will result and the steering angle signal only begins to control the field excitation when the steering angle reaches $\theta_2$. Thus, field excitation is never below $F_1$, although higher values of excitation will automatically result with either increased armature current or increasingly sharper steering angles. The setting of resistor 118 determines the minimum field $F_1$ and the ratio of the values of resistors 113 and 114 determine the slope of line 130.

From the foregoing, it will be recognized that a control system for an electric vehicle having separate drive motors for its driven wheels has been described; a control system which selects the drive torque as some constant value depending on the vehicle steering angle and in which the selected torque is continuously apportioned to the drive wheels as a function of the steering angle. It will be further recognized that, while there has been shown and described what is considered a preferred embodiment of the invention, various other modifications may be made therein. It is intended to claim all such modifications which fall within the true spirit and scope of the present invention.

The invention claimed is:

1. In a control system for an electrically powered vehicle of the type having dual drive motors with series connected armature windings and separately excited field windings, said dual motors being arranged such that one motor thereof is provided for each of two driven wheels on a common axle line, apparatus for automatically limiting the vehicle speed as a function of its turning angle during a turning maneuver, comprising:

field regulating means for regulating the excitation of said field windings in accordance with a field regulating signal;

means providing a first signal representative of the current flowing in said armature windings;

means providing a turning angle signal having a value which is a function of the selected turning angle for said vehicle;

a field excitation selector having first and second inputs receiving said first signal and said turning cycle signal thereat, respectively, said selector being operative to select as said field regulating signal said first signal or said turning angle signal, depending on which one of said signals provides the greatest field excitation, whereby said field excitation is increased with sharper turning angles and said vehicle is thereby automatically operated at a reduced speed.

2. The apparatus of claim 1 wherein said field excitation selector includes means providing a reference signal representative of a fixed minimum value of field excitation and said selector is further operative to select said first signal, said turning angle signal, or said reference signal as said field regulating signal, depending on which one of said signals provides the greatest field excitation.

3. The apparatus of claim 2 wherein said turning angle signal is provided as an analog signal whose magnitude is proportional to the turning angle and whose polarity is indicative of turning direction, and further including:

an absolute value detector for receiving said turning angle signal and providing an output signal proportional to the absolute value of said turning angle signal, said output signal being applied to the second input of said field excitation selector.

4. The apparatus of claim 3 wherein said field excitation selector comprises analog circuitry including a maximum value selector for selecting said first signal, said turning angle signal, or said reference signal, depending on which is of maximum value.

5. The apparatus of claim 4 wherein said field regulating means comprises a pair of multiplier circuits providing one such circuit for each field winding, each circuit of said pair being adapted to receive said field regulating signal.

* * * * *